United States Patent [19]
Maston et al.

[11] Patent Number: 5,961,928
[45] Date of Patent: *Oct. 5, 1999

[54] GAS GENERATING SYSTEM AND METHOD

[75] Inventors: Valerie A. Maston, Springfield, Mass.;
Leslie L. VanDine, Manchester, Conn.;
Richard A. Sederquist, Newington,
Conn.; Raymond M. Smith, Windsor,
Conn.; Paul A. Grubb, Ellington,
Conn.; Theodore S. Malinowski, South
Windsor, Conn.

[73] Assignee: International Fuel Cells Corporation,
South Windsor, Conn.

[*] Notice: This patent is subject to a terminal disclaimer.

[21] Appl. No.: 08/838,118

[22] Filed: Apr. 15, 1997

[51] Int. Cl.$^6$ .............................. G05D 7/00; H01M 6/30
[52] U.S. Cl. ................... 422/110; 422/105; 422/111;
429/22; 429/23; 429/24; 48/197 R
[58] Field of Search ........................ 422/105, 111,
422/110, 182; 423/418.2, 245.3; 48/85,
197 R; 429/22, 23, 24

[56] References Cited

U.S. PATENT DOCUMENTS

| | | | |
|---|---|---|---|
| 3,764,123 | 10/1973 | Beggs et al. | 266/29 |
| 4,098,959 | 7/1978 | Fanciullo | 429/25 |
| 4,098,960 | 7/1978 | Gagnon et al. | 429/25 |
| 4,642,273 | 2/1987 | Sasaki | 429/22 |
| 5,401,589 | 3/1995 | Palmer et al. | 429/13 |

*Primary Examiner*—Hien Tran
*Assistant Examiner*—James Kennedy

[57] ABSTRACT

A system for generating a desired output gas from an input fuel for use in a downstream process is disclosed. The system includes a plurality of fuel processing units to generate the desired output gas, wherein each of the plurality of fuel processing units includes a reformer which uses waste gas output from the downstream process to facilitate the processing of the fuel. Each of the fuel processing units is operational over a range up to full capacity, wherein the plurality of fuel processing units are interconnected in an collective operating scheme to process the fuel. A control system is provided for controlling the plurality of fuel processing units in response to requirements of a dynamic load demand from the downstream operation. The control system is operative to adjust the operational level of each of the plurality of fuel processing units to produce individual responses from each of the fuel processing units. The individual responses are combined to produce a collective response for meeting the requirements of the dynamic load demand. A method for generating a desired output gas from an input fuel for use in a downstream process is also provided.

20 Claims, 2 Drawing Sheets

GAS GENERATING SYSTEM AND METHOD

TECHNICAL FIELD

This invention is directed to the production of industrial gases, and more particularly, to a system and method for generating an industrial gas from a hydrocarbon feed stock (fuel) in response to dynamic load demands from a downstream process.

BACKGROUND OF THE INVENTION

Reaction apparatus for the production of industrial gases, such as hydrogen, are well know in the prior art. These fuel processing apparatus employ steam reforming as the most common method for producing hydrogen from hydrocarbon fuels such as natural gas or naphtha. Conventional commercial size fuel processing apparatus (reformers) are typically very large constant output units that are limited in their ability to adjust to variable demand or flow requirements.

Electric power generating devices known as fuel cell power plants are electrochemical devices that operate by consuming hydrogen on an anode electrode of their fuel cell stack assembly (CSA). The hydrogen demand of the fuel cell power plant is variable and therefore not easily adaptable to the constant output characteristics of conventional commercial size reformers. This led the assignee into the successful development of a compact reformer and its associated technology. The compact reformer, operating as an integral part of the power plant, is characterized by the ability to produce a hydrogen rich stream that varies in response to changing power plant hydrogen consumption. This technology is exemplified in assignee's U.S. Pat. Nos. 4,098,588 and 4,098 589.

It is also recognized that other industrial gas requirements exceed the hydrogen purity levels typically produced by a fuel processing apparatus of either the conventional commercial size designs or the compact reformer designs used in fuel cell power plants. To meet such higher purity hydrogen requirements, additional processing by secondary devices such as pressure swing absorption (PSA), cryogenic or membrane units can be used. However, when this higher purity requirement is combined with variable demand only a compact reformer of the type used in fuel cell power plants has the inherent ability to meet this need. Unfortunately, it is not possible to directly couple a compact reformer to a secondary unit such as a PSA device without making significant changes in the reformer unit's operational control system.

A fuel cell power plant reformer seeks to supply hydrogen rich gas to the CSA in response to hydrogen consumption which is proportional to the fuel cell gross current or electrical load. The fuel cell power plant exhaust gas (waste gas), depleted in hydrogen, is fed to the reformer burner to provide heat for the steam reforming process. Reformer process fuel and steam feed is adjusted in proportion to the fuel cell gross current, but with the requirement to also maintain a set reformer temperature.

For a fuel cell power plant operating at a steady point, constant hydrogen consumption, the reformer temperature can be increased by increasing the reformer fuel feed because it results in a direct and rapid increase of the amount of exhaust gas fed to the reformer burner. This means added energy input to the reformer and hence a rise in reformer temperature. Conversely, a reduction in fuel feed at any steady operating point means a drop in reformer temperature.

This direct link between reformer fuel feed and reformer heating in a fuel cell power plant is not possible when a compact reformer is connected in series to another hydrogen consumption or extraction process such as a PSA unit. The PSA waste gas or blow down purge gas is used by the reformer burner to heat the unit. However, the flow rate and heating value of this waste gas depends on the specific operation of the PSA unit, but there is no direct link between the fuel feed level to the reformer and the quality or quantity of waste gas supplied back to the reformer burner.

There exists a need, therefore, for a system and method of gas generation, and a temperature and flow control system and method therefor, which accounts for the lack of a direct link between feed gas and the waste gas fed to reformer burners thereof from a down stream unit such as a PSA, and which is applicable to multiple reformers joined together as a single operating unit to provide increased capacity, wherein each unit requires its own waste gas supply from the PSA and individual control of its temperature.

DISCLOSURE OF INVENTION

The primary object of this invention is to provide an improved fuel processing system, which system is both responsive to dynamic load demand of a downstream process and has a flexible operational range.

Another object of this invention is to provide an improved fuel processing system and method for the production of a desired gas for a downstream process, which system and method use a plurality of fuel processing systems arranged an interfunctional operational scheme.

Yet another object of this invention is to provide an improved fuel processing system and method which includes a plurality of fuel processing systems which function as a cohesive unit to produce a cumulative response to a dynamic load demand of a downstream process.

And yet another object of this invention is to provide an improved fuel processing system and method which includes a plurality of individual fuel processing systems controlled by a control system, which systems operate as a combined unit to produce a cumulative response to dynamic load demands of a downstream process.

And still another object of this invention is to provide an improved fuel processing and consumption system which includes a plurality of collectively operable fuel processing units controlled by a control system and a downstream gas production process for consuming gas produced via said fuel processing systems and producing a refined gas therefrom, wherein the fuel processing units are dynamically responsive to the load demand of the downstream process.

The objects and advantages stated herein are achieved by the systems and methods of the present invention. One such system comprises a system for generating a desired output gas from an input fuel for use in a downstream process is disclosed. The system includes a plurality of fuel processing units to generate the desired output gas, wherein each of the plurality of fuel processing units includes a reformer which uses waste gas output from the downstream process to provide energy for the processing of the fuel. Each of the fuel processing units is operational over a range up to full capacity, wherein the plurality of fuel processing units are interconnected in an collective operating scheme to process the fuel. A control system is provided for controlling the plurality of fuel processing units in response to requirements of a dynamic load demand from the downstream operation. The control system is operative to adjust the operational range of each of the plurality of fuel processing units to produce individual responses from each of the fuel processing units. The individual responses are combined to produce a collective response for meeting the requirements of the dynamic load demand.

One such method for achieving the objects and advantages stated herein includes a method for generating a desired output gas from an input fuel for use in a downstream process. The method includes the steps of providing a plurality of fuel processing systems operational over a range up to full capacity; processing the fuel using the fuel processing systems to generate the desired output gas; using waste gas output from the downstream process to provide energy for the step of processing; and controlling the plurality of fuel processing systems in response to requirements of a dynamic load demand from the downstream operation including adjusting the operational range of each of the plurality of fuel processing systems to produce individual responses from each of the plurality of fuel processing systems; and combining the individual responses to produce a collective response for meeting the requirements of the dynamic load demand.

BEST MODE FOR CARRYING OUT THE INVENTION

Figure 1:
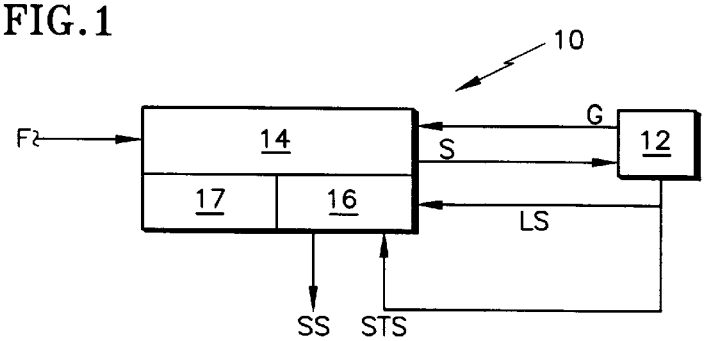
FIG. 1 is a simplified schematic representation of the fuel processing system of the present invention, including a control system therefor, which includes a plurality of inter-functioning fuel processing units.

Referring now to the drawings in detail, there is shown in FIG. 1, a schematic representation of the fuel processing and control system of the present invention, which is designated generally as 10. System 10 is shown in use with a downstream gas consuming process 12 which has a dynamic load demand signal LS to which system 10 is responsive. The downstream process 12 may be any gas consuming process such as a cryogenic process, a membrane process, a fueling station, a hydrogenation process, a pressure swing adsorption process, etc. In general, system 10 functions to sense the dynamic load of the downstream process 12 and processes fuel F to produce the desired gas S for the downstream process, in an efficient, maximized manner.

Figure 3:
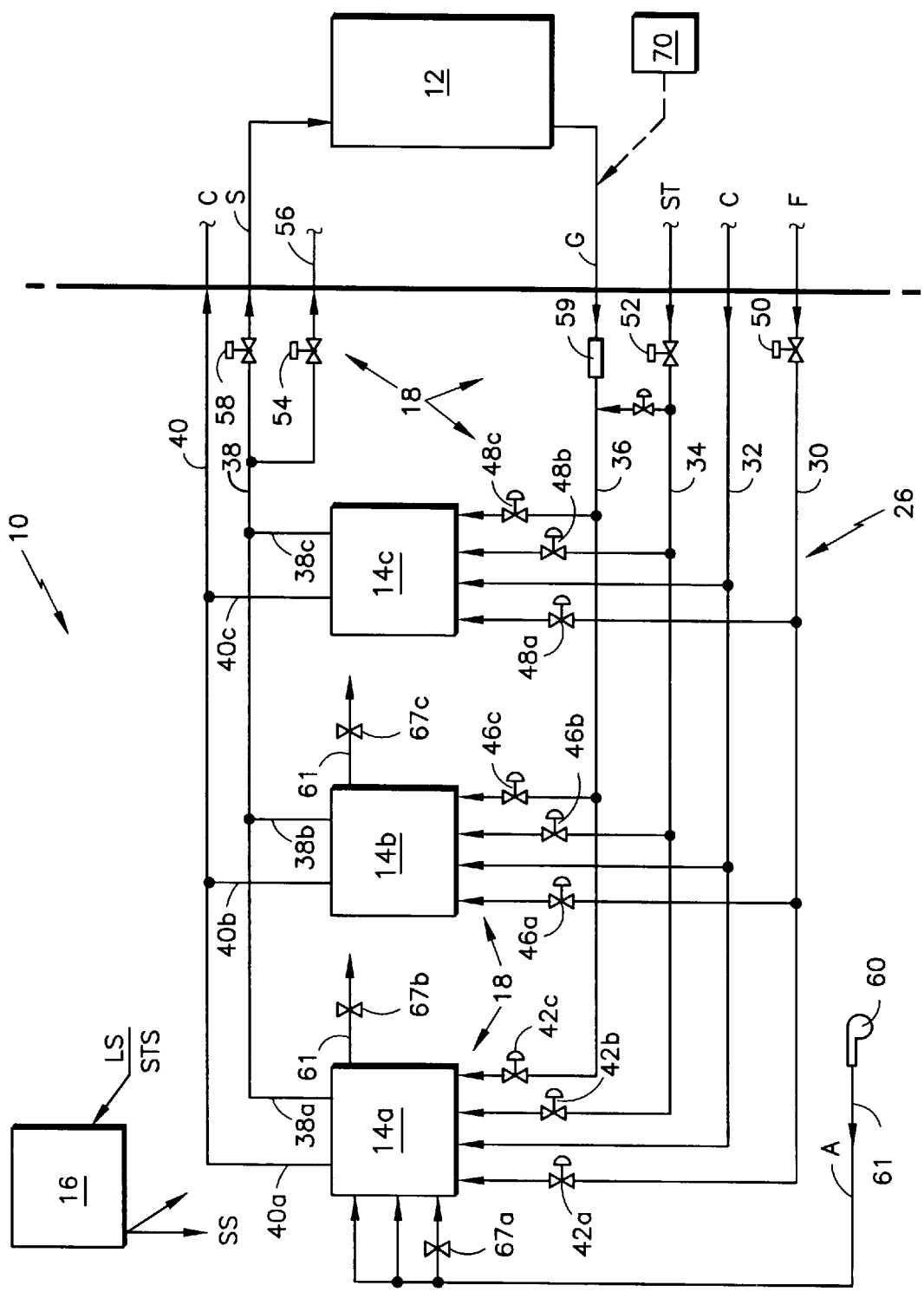
FIG. 3 is a more detailed schematic view of the system shown in FIG. 1, including the various control elements of the system.

With reference to FIG. 1, system 10 uses a plurality of main components including fuel processing units 14. The number of fuel processing units shown in FIG. 3 is exemplary only and accordingly, any number which are necessary to meet system and downstream process requirements can be used. The system further includes a control system 16 for controlling the overall processing method and the various elements used therein, a ventilation system 17, and various control elements 18, discussed in greater detail below.

The multiple fuel processing units 14a–14c, as shown in FIG. 3, can be arranged in one of an equal proportional or an independent operating scheme under the control of control system 16. For the equal proportional scheme, each fuel processing unit 14a–14c contributes substantially equally to the production of the desired gas S for use by the downstream process 12 at a percentage of its full operating capacity. The independent operating scheme, on the otherhand, as directed by control system 16, is operable to maximize the efficiency of the system in gas production depending on the demand of the downstream process 12, causing fuel processing unit 14a–14c to operate over a range of operating percentages of full capacity but not necessarily all at once. The preferred operational scheme is the equal proportional scheme wherein control system 16 functions to reduce and increase the operating percentages of fuel processing units 14a–14c, in response to the demand by downstream process 12, and to provide a cumulative response, so as to prevent the need to shut down individual units or start up individual units in response to the dynamic load demand of the downstream process 12. The operating modes may be used on a switching basis depending on which is most efficient for the particular the downstream process demands.

The fuel processing units 14a–14c used in system 10 are preferably International Fuel Cell Corporation units which are also used in fuel cell power plants. Such processing units are shown in U.S. Pat. Nos. 4,098,588 and 4,098,599 to Buswell et al and U.S. Pat. No. 4,098,959 to Fanciullo, and are hereby incorporated by reference with regard to their detailed descriptions. The patents are assigned to United Technologies Corporation, for which International Fuel Cells is a subsidiary.

For ease of describing the system herein, the processing units 14a–14c will be briefly described with reference to FIG. 2, it being understood that the detailed description of the units is to be retrieved from the incorporated references.

Units 14a–14c are each preferably comprised of a steam reformer 20 and a burner 23. Burner 23 is operational to combust a burner fuel G, provided through input 21, in order to provide the required amount of heat for use by steam reformer 20 for reforming the combination of fuel F, input via input 22 into reformer 20 and steam ST, input via input 24. In addition to inputs 21 and 22, air A, necessary for combustion, is provided through input 24 into the burner section 23.

As shown in FIGS. 1 and 3, the operating scheme of system 10 is facilitated through control system 16, control elements 18 and a plurality of fluid connections or lines 26 connecting the units 14a–14c with external fluid inputs, outputs to the downstream process 12 and inputs from the downstream process. Control system 16 is preferably in the form of a software based algorithm for controlling the various elements of the system. However, a electronic oriented system may also be used.

Connections 26 comprise a plurality of lines into and out of each of the fuel processing units. As shown in FIG. 2, and in greater detail in FIG. 3, each fuel processing unit includes a line 30 whereby fuel F is input into the reformer portion 20 thereof. Steam is supplied to the reformer through line 34. The steam is used in the steam reforming of the fuel F to produce gas S, preferably in the form of a hydrogen rich gas. Another line 32 is provided for the introduction of a coolant C into each fuel processing unit 14a–14c for cooling the system. Another line 39 introduces steam ST into the burner portion 23 of the system for subsequent combination with the burner fuel G and line 61 supplies air A that is also used for combustion. Burner fuel G, in the form of waste-gas, or off-gas, from the downstream process 12, is introduced through line 36 into the burner of each of the fuel processing units 14a–14c. Each fuel processing unit 14a–14c also includes an output line 38a, 38b, and 38c for outputting the generated gas S to a common line 38 for introduction into the downstream process 12. The amount and type of gas S which is output to line 38 from the fuel processing units is dependent upon the needs of the downstream process 12 and also on the amount and type of fuel F input into the systems. In a preferred embodiment, the downstream process 12 is a pressure swing adsorption process, the desired gas S is a hydrogen rich gas and the input fuel F is natural gas. In addition to outputting the desired gas S, each unit outputs the coolant C through lines 40a, 40b, and 40c to a common line 40 for recooling and recirculation. Accordingly, each fuel processing unit 14a–14c uses waste gas G from the downstream process 12 to fuel its burner 23 which provides heat to reformer 20. Steam ST is combined with the waste gas G prior to burning so as to stabilize the fuel to avoid carbon deposition at low flow and also to reduce burner NOX formation. Control unit 16 is operable through control elements 18 to control the flow of waste gas G, steam ST, coolant C and fuel F, and the desired gas S from the units, as required by downstream process 12, in response to its dynamic load demand LS. The actual control methodology is discussed in more detail below.

Control elements 18 for fuel processing unit 14a are in the form of valves 42a–42c for controlling flow of fuel F, steam ST and waste gas G, respectively, into the fuel processing unit. Similar valves 46a–46c are provided for unit 14b and similar valves 48a–48c are provided for unit 14c. Additional control elements 18 include valve 50 at the input of the fuel line 30, valve 52 at the input of the steam line 34, valve 54 at the output of vent line 56 for venting out gas S in the occurrence of excessive back pressure, a valve 58 at the output of line 38 for controlling gas S introduced to downstream process 12, and a flow meter 59 for metering and controlling the amount of waste gas G supplied from downstream process 12. In addition, a blower 60 is provided for introducing air A through line 61 into the burner portion 23 of each fuel processing unit 14a–14c for facilitating combustion. All of elements 18 are under the control of control system 16, so as to cause system 10 to be directly responsive to the dynamic load demand LS of downstream process 12.

Figure 2:
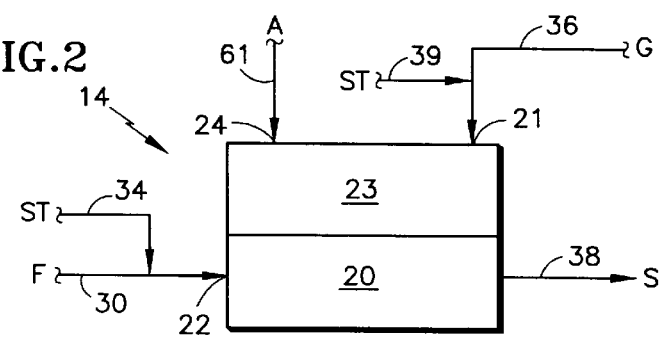
FIG. 2 is a more detailed schematic representation of a single fuel processing unit in accordance with the principles of the present invention including the various inputs and outputs associated therewith, in accordance with the principles of the present invention.
Figure 4:
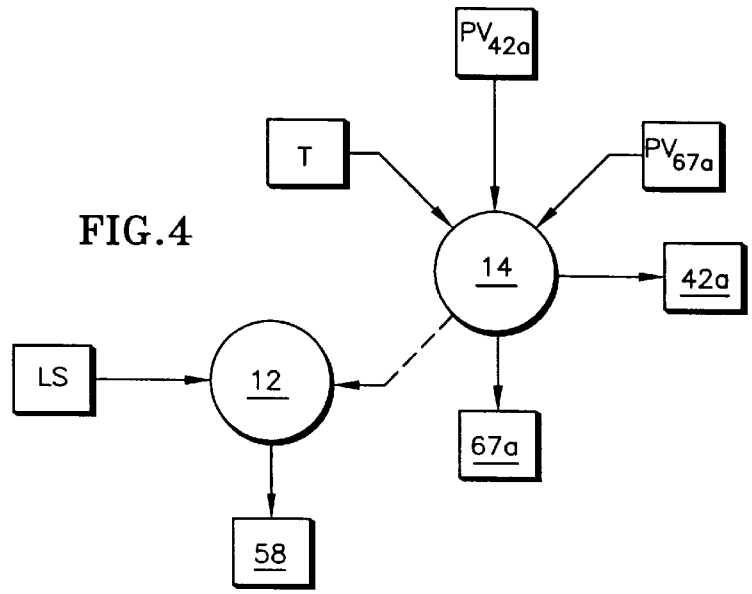
FIG. 4 is a schematic diagram indicative of the control scheme of the present invention.

Referring to FIGS. 1, 2 and 4, control system 16 receives startup/stop signal STS and load demand signal LS from downstream process 12 and provides operating status signals SS back to the controller (not shown) of the downstream process 12. The control strategy of system 16 is based on the load signal from the downstream process 12 which is preferably in the form of flow rate or pressure level. In one embodiment, a receiving tank in downstream process 12 may be instrumented with a pressure transducer. Accordingly, the load signal LS from the transducer will demand more process fuel F and steam ST when the pressure decreases, indicating more demand by downstream process 12, and less process fuel F and steam ST when the pressure rises, indicating lower demand by process 12. In other circumstances any variable signal representing a downstream demand could be used. Load signal LS is used by system 16 to control the input level of fuel F into fuel processing units 14, and specifically reformer 20, as well as temperature within each of the fuel processing units 14a–14c.

With reference to FIGS. 2 and 4, the control scheme of system 10 will be described with particular reference to fuel processing unit 14A, it being understood that the following description applies equally to all of the fuel processing units of the system.

As indicated, the control strategy for the system is based upon the load signal LS coming from the downstream process 12 in the form of flow rate or pressure. The load signal LS is used by system 10 and control system 16 to adjust the amount of fuel F input to the reformer 20 and reformer temperature T of the fuel processing units 14. Referring to FIGS. 2 and 4, the temperature T of the reformer 20 is the main parameter considered by the control system. That is, based on the dynamic load demand of downstream process 12 and the required flow of fuel F to meet this demand, control system 16 operates to maintain temperature T of the reformer at a fixed level. Accordingly, and with reference for example to unit 14a, control algorithm of system 16 for maintaining reformer temperature T at the fixed level looks to the reformer temperature T, the position $PV_{42a}$ of the burner fuel flow valve 42a, and the position $PV_{67a}$ of the burner airflow valves 67a to make adjustments to the burner air and fuel flow rates in order to maintain temperature T at a level in accordance with the dynamic load demand and required flow of fuel F.

In order to maintain reformer temperature T at the required level to facilitate the chemical reaction or conversion of fuel to $H_2$ rich products in reformer 20 regarding fuel F, when the amount of fuel F is increased to increase the supply of desired gas S to the downstream process, a sufficient amount of waste gas G must be available for reformer burner 23 to provide the heat to maintain the reformer temperature. If sufficient waste gas G is not available from the downstream process, or if the waste gas varies in composition so as to effect reaching the required reformer temperature, thereby not allowing reformer burner 23 to maintain the required reformer temperature for reforming the desired amount of fuel F to produce gas S, a signal is provided from control system 16 to the fuel control valve 42a to reduce the flow of fuel F. Therefore, this approach allows for variations in the waste gas G with regard to composition variances and quantity, by subsequently lowering the flow of fuel F.

From a sequential standpoint, and referring still for example to unit 14a, the load signal LS is received by control system 16 and adjustment to the flow of fuel F into reformer 20 is made. If the reformer flow of fuel F and steam flow ST is increased such that the heat output of the burner must be increased to facilitate the required chemical reaction, flow of waste gas G from downstream process 12 is increased via fuel meter 59 and valve 42c so as to increase the amount of reformer burner fuel, and subsequently, the heat output of the burner. Coinciding with increases and decreases in the flow of waste gas G, the flow of steam ST is also increased and decreased accordingly via valve 52 and the independent valve of unit 14a, i.e. valve 42b. the remaining units 14b and 14c work in the same manner as described for unit 14a.

The control system 16 and control scheme thereof provides protection to system 10 by using a pressure sensor in relief venting valve 54 to ensure that the system is not back pressured by the downstream process 12 with which is interfaced. Accordingly, control system 16 monitors a signal to operate the relief valve 54 and shut down the system if overpressure should occur over a specified period of time.

Control system 16 for system 10 has at least two operating modes. The preferred equal-proportional operating mode functions to operate entire system 10 including each independent fuel processing system 14a–14c, as one large system. That is, if the downstream process requires a load adjustment, the fuel processing systems 14a–14c are adjusted via control system 16 to operate on equal operational levels to provide a cumulative level of operation collectively responsive to the load demand LS. For example, if the load demand from downstream process 12 requires system 10 to operate at 50% capacity, each fuel processing system 14a–14c is caused by control system 16 to operate at 50% capacity. In this manner, control system is operable in a manner as described above with reference to fuel processing unit 14a, to adjust fuel flow and accordingly, the level of output of the desired gas S for each unit 14a–14c. In a typical system design, normal operation will require the individual units to operate at a capacity much less than full, so as to have excess capacity on reserve as needed. In the second mode, the multiple fuel processing units 14a–14c are caused to operate independently. Accordingly, if the downstream process 12 issues a load demand LS which requires the system 10 to operate at a partial capacity, the fuel processing units 14a–14c are sequenced to maximize the output of only a few individual units which operate at their respective optimal points. This configuration or mode allows for the remaining fuel processing subsystems which are not in operation or are at idle to provide redundancy if a failure occurs in one of the fuel processing units. For example, in a system 10 consisting of three fuel processing units 14a–14c, if the load demand is 50% capacity, one of the units 14a may be shut down by closing its burner fuel, burner air, process fuel and process steam valves:, and operating the units 14b and 14c at 75% capacity each.

Figure 5:
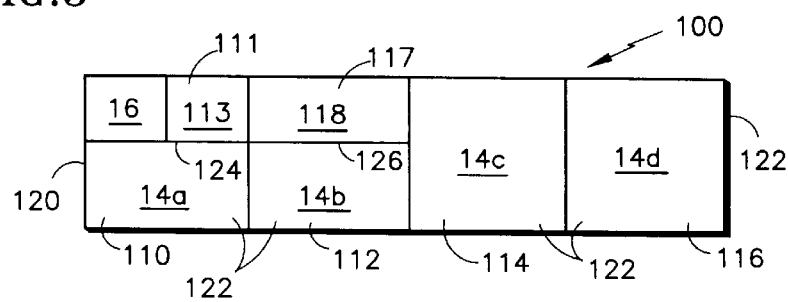
FIG. 5. is a simplified schematic view of a modular pallet design for arranging the system of the present invention.

System 10 described above is preferably arranged on a single pallet 100 allowing for modularity of the system and thereby providing a cost effective approach for satisfying a range of output requirements. FIG. 5 shows an example of four fuel processing units 14a–14d arranged on the pallet 100. The pallet 100 is preferably divided into four sections or compartments, one section per fuel processing unit. Section 110 contains the first fuel processing unit 14a and control system 16, and a compartment 111 contains electronic controls 113 for use with system 16. Sections 112, 114 and 116 each include a fuel processing unit 14b–14d, respectively. Section 112 also includes a compartment 117 containing the remainder 118 of the electronic controls 113. Preferably, the units are enclosed by an enclosure 120 which includes a plurality of identical interchangeable and removable panels 122. As the number of fuel processing units in the system is changed, the only changes to the pallet are the arrangement of the lines or pipes 26, described above for transporting the various fluids, and replacement of the fuel compartment ventilation fan system for each unit 14. For example, a three fuel processing unit, as described above, would have the last section 116 removed and the piping or lines would be adjusted to accommodate the lower flow requirements of the new system. A mount for the fuel compartment ventilation system would be adjusted to provide the proper airflow in the compartment. Cabinet ventilation for each unit is preferably set up so that all of the electrical components are in a separately ventilated compartment or are in an area where direct outside air flows over them. In a preferred embodiment, the electrical compartments 111, 117 are separated by walls 124, 126 from the fuel processing unit compartments 110 and 112. The electrical compartment preferably contains the controller 16 and preferably extends the entire height of the unit 14 for which it is used. The compartments 111,117 also preferably contain the motor for the fuel compartment ventilation fan and the air blower 60 that provides air to the reformer burners.

In operation, and referring to FIGS. 1–4, system 10 is responsive to the dynamic load demand of the downstream process 12 so as to supply the demanded amount of gas thereto. Accordingly, control system 16 receives start/stop signals STS from downstream process 12 along with the load demand signal. If the signal is a startup signal, the load signal, in the form of pressure or flow rate, is processed by control system 16 and the individual fuel processing units 14a–14c are invoked in accordance with the chosen system mode, preferably the equal proportional mode, wherein all of the fuel processing units 14a–14c function along with the control elements 18 of system 10 and control system 16, as a single unit. Therefore, in response to load signal LS, the flow of fuel F through valves 42a, 46a, and 48a of units 14a, 14b and 14c, respectively, are adjusted, as well as steam ST through valves 42b, 46b and 48b and air A through valves 67a–67c. Assuming increased fuel flow is desired so as to increase the output of gas S to the downstream process 12, each of valves 42a, 46a and 48a are opened to increase flow of fuel F. Valves 42b, 46b and 48b along with valves 67a–67c are also adjusted to increase steam and air flow, respectively. The temperature T of reformer 20 is checked to determine if the temperature is high enough to facilitate the required chemical reaction with the adjusted amount of fuel F so as to produce the desired amount of output gas S. Reformer temperature T is adjusted by increasing the flow of waste gas G into burner portion 23 of reformer 20 via valves 42c, 46c and 48c of units 14a, 14b, 14c, respectively. If the waste gas G is available in the necessary amount, the required temperature T for facilitating the required heat and chemical reaction with the adjusted amount of fuel flow is available. However, unlike a typical fuel cell power plant where the burner fuel gas is only supplied as waste gas from the output of the fuel cell, this system may optionally use downstream waste gas from an additional or another supply 70, shown for example in FIG. 3, so that the burner fuel feed is not necessarily only connected to the downstream process. For this system, if the waste gas G is insufficient in volume or if the composition thereof will not support the temperature required for reforming fuel S, control system 16 is operative to again adjust the positions of fuel flow valves 42a, 46a and 48a and thereby reduce flow of fuel F to a level at which the proper temperature T can be reached with the given supply and composition of waste gas G or acquire additional gas G from another supply, if it is available. The flow of Steam ST and air A is also adjusted accordingly. This process is dynamic in that as load demand changes, system 10 reacts to maintain the desired reformer temperature T and flow of fuel F, so as to adjust the output of the desired gas S.

In one preferred embodiment of this invention, the downstream process is a pressure swing adsorption system, the fuel F is natural gas and the gas S is a hydrogen rich gas stream. The pressure swing adsorption system is operable to use gas S to produce a highly purified form of hydrogen.

In another mode of system 10, fuel processing units 14a–14c may be arranged by control system 16 in an independent operating scheme. In accordance with this scheme, and in operation, control system 16 is operative to adjust the operational capacity of the individual fuel processing units to maximize the efficiency of the system. For example, upon a low demand, it may be most efficient to run two of the fuel processing units at a given percentage of full capacity while maintaining the third or remaining units, for example, at idle. Also, it may be preferable to run different units at different capacities depending upon the known performance of the particular unit relative to other units. If the fuel conversion efficiency of one unit is degraded over time, the contribution percentage of that unit may be reduced relative to the other units.

In the preferred equal proportional operating mode, all fuel processing reformer units can respond rapidly in unison to changes in demand from downstream process 12. The system is less efficient at low output because all units must be kept hot and support a heat loss which is essentially constant at all power levels. However, in this circumstance, a single fuel processing unit operating at full output may efficiently sustain the requirements of the downstream process 12. Accordingly, the remaining units may be shutdown or maintained in a standby reduced temperature condition with no or minimal flow. This operating mode lacks rapid response capability since to achieve full system output the idle units must be reheated to full operating temperature to achieve their design output. To obtain the most efficient operation of the system, it may be desirable to select the mode that may be more efficient than the other for a particular application.

It should be understood that with respect to the above described apparatus, system and process, any number of fuel processing units 14 can be used in system 10 and that the three and four fuel processing unit example disclosed is but one embodiment of the invention. Depending upon the demand of the downstream process, the number of fuel processing units may be substantially increased or decreased, it being understood again that the system 10 described above can be adopted easily for use with all variations of the system.

The primary advantage of this invention is that an improved fuel processing system is provided, which system is both responsive to dynamic load demand of a downstream process and has a flexible operational range. Another advantage of this invention is that an improved fuel processing system and method for the production of a desired gas for a downstream process are provided, which system and method use a plurality of fuel processing systems arranged an interfunctional operational scheme. Yet another advantage of this invention is that an improved fuel processing system and method are provided which includes a plurality of fuel processing systems which function as a cohesive unit to produce a cumulative response to a dynamic load demand of a downstream process. And yet another advantage of this invention is that an improved fuel processing system and method which includes a plurality of individual fuel processing systems controlled by a control system are provided, which in accordance with the system and method, operate as a combined unit to produce a cumulative response to dynamic load demands of a downstream process. And still another advantage of this invention is that an improved fuel processing and consumption system is provided which includes a plurality of collectively operable fuel processing units controlled by a control system and a downstream gas production process for consuming gas produced via said fuel processing systems and producing a refined gas therefrom, wherein the fuel processing units are dynamically responsive to the load demand of the downstream process.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A system for generating a desired output gas from an input fuel for use in a downstream process, comprising:

a plurality of means for processing said fuel to generate said desired output gas, wherein said plurality of means for processing include means for using waste gas output from said downstream process to provide energy for the processing of said fuel, wherein each of said plurality of means for processing is operational at a range of operational levels up to full capacity, and wherein said plurality of means for processing are interconnected in an collective operating scheme to process said fuel;

means for controlling said plurality of means for processing in response to a dynamic load demand from said downstream operation, wherein said means for controlling is operative to adjust the operational level of each of said plurality of means for processing to produce individual responses from each of said plurality of means for processing, wherein said range of operational levels may vary between each of said plurality of means for processing from idle to full capacity; and means for combining said individual responses to produce a collective response for meeting said dynamic load demand.

2. The system according to claim 1, wherein each of said plurality of means for processing is a fuel processing system which includes a burner having an input for receiving said waste gas from said downstream process and a reformer, and wherein said burner combusts said waste gas to produce heat for use by said reformer to convert said fuel into said desired gas.

3. The system according to claim 2, further including means for supplying steam to said waste gas prior to entering said burner for stabilizing said waste gas for combustion.

4. The system according to claim 3, wherein each of said fuel processing systems includes a plurality of control means for the individual control of parameters including at least one of flow of said fuel, flow of said steam, flow of air, and temperature of said reformer.

5. The system according to claim 4, wherein said means for controlling includes means for individually controlling said parameters of each of said plurality of fuel processing systems so as to control participation in said collective operating scheme.

6. The system according to claim 1, wherein said means for controlling includes means for communicating with said downstream process to receive a dynamic load signal indicative of said demand.

7. The system according to claim 6, wherein said means for controlling includes means for equally distributing said load demand to each of said means for processing such that each of said means for processing contributes substantially equally to said collective response.

8. The system according to claim 1, wherein said means for processing comprises a plurality of fuel processing elements, wherein each of said elements includes means for receiving said fuel, said waste gas, air and steam for use in processing said fuel.

9. The system according to claim 8, further comprising means for directing said fuel, said waste gas, said air and said steam to said means for receiving said fuel processing elements, and control elements operative with said means for controlling and said means for directing the distribution of said fuel, said waste gas, said air and said steam among said fuel processing elements.

10. The system according claim 9, wherein said control element comprise at least one of valves and flow meters in communication with said means for controlling the flow of said fuel, the flow of said waste gas, the flow of said air and the flow of said steam to said elements.

11. The system according to claim 9, wherein said means for processing have an operating temperature for processing said fuel which increases with an increase in fuel flow and wherein said waste gas is available in a quantity and composition, further including means for sensing said operating temperature, wherein said means for controlling includes means for causing said control elements to increase said fuel flow to a higher flow level and increase flow of said waste gas in response to an increase in said load demand, wherein if at least one of said quantity and composition of said waste gas is insufficient for maintaining said temperature at a temperature level for processing said fuel at a higher operational level, said means for causing further for causing a decrease in fuel flow until said waste gas is sufficient in quantity and composition.

12. A method for generating a desired output gas from an input fuel for use in a downstream process, comprising the steps of:

providing a plurality of fuel processing systems operational over a range of operational levels up to full capacity;

processing said fuel using said fuel processing systems to generate said desired output gas;

using waste gas output from said downstream process to provide energy for the step of processing; and controlling said plurality of fuel processing systems in response to requirements of a dynamic load demand from said downstream operation including, adjusting the operational level of each of said plurality of fuel processing systems to produce individual responses from each of said plurality of fuel processing systems, wherein said step of adjusting includes varying said operational levels from idle to full capacity; and combining said individual responses to produce a collective response for meeting said dynamic load demand.

13. The method according to claim 12, said step of using includes combusting said waste gas to produce heat for reforming said fuel into said desired gas.

14. The method according to claim 13, further including the step of supplying steam to said waste gas prior to said step of combusting for stabilizing said waste gas for combustion.

15. The method according to claim 14, wherein said step of controlling further includes the step of individually controlling a plurality of individual parameters of said fuel processing systems, wherein said parameters include at least one of flow of said fuel, flow of said steam, and temperature of said burner, so as to control participation of said fuel processing systems in a collective operating scheme.

16. The method according to claim 12, wherein said step of adjusting includes the step of communicating with said downstream process to receive a dynamic load signal indicative of said demand.

17. The method according to claim 16, wherein said step of adjusting further includes the step of equally distributing said load demand to each of said means for processing such that each of said means for processing contributes substantially equally to said collective response.

18. The method according to claim 12, further including the step of said fuel processing systems receiving said waste gas, air and steam for use in processing said fuel.

19. The method according to claim 18, further including the steps of directing said fuel, said waste gas, said air and said steam to said fuel processing elements, and said step of adjusting including the step of controlling the distribution of said fuel, said waste gas, said air and said steam among said fuel processing elements.

20. The method according to claim 12, wherein said fuel processing systems have an operating temperature for processing said fuel which increases with an increase in fuel flow and wherein said waste gas is available in a quantity and composition, further including:

sensing said operating temperature; and said step of controlling including causing an increase in fuel flow level and flow of said waste gas for increasing said operational levels in response to an increase in said load demand, wherein if at least one of said quantity and composition of said waste gas is insufficient for maintaining said temperature at a temperature level for processing said fuel at an increased operational level, said step of controlling including causing a decrease in fuel flow level until said waste gas is sufficient in quantity and composition to sufficiently support said fuel processing at said fuel flow level.

* * * * *